(12) United States Patent
Burns

(10) Patent No.: US 7,712,717 B2
(45) Date of Patent: May 11, 2010

(54) DISPLAY MOUNTING APPARATUS

(75) Inventor: Don Burns, Tustin, CA (US)

(73) Assignee: Vantage Point Products Corporation, Santa Fe Springs, CA (US)

( * ) Notice: Subject to any disclaimer, the term of this patent is extended or adjusted under 35 U.S.C. 154(b) by 7 days.

(21) Appl. No.: 11/916,629

(22) PCT Filed: May 23, 2006

(86) PCT No.: PCT/US2006/020109

§ 371 (c)(1),
(2), (4) Date: Dec. 5, 2007

(87) PCT Pub. No.: WO2006/127826

PCT Pub. Date: Nov. 30, 2006

(65) Prior Publication Data

US 2008/0210837 A1 Sep. 4, 2008

Related U.S. Application Data

(60) Provisional application No. 60/683,864, filed on May 23, 2005.

(51) Int. Cl.
*E04G 3/00* (2006.01)

(52) U.S. Cl. ...................... 248/291.1; 248/917; 248/919

(58) Field of Classification Search .............. 248/276.1, 248/277.1, 281.11, 284.1, 286.1, 917, 919
See application file for complete search history.

(56) References Cited

U.S. PATENT DOCUMENTS

| | | | |
|---|---|---|---|
| 6,923,413 B2 | 8/2005 | Dozier | |
| D532,290 S | 11/2006 | David | |
| D538,140 S * | 3/2007 | Ly Hau et al. | ............... D8/373 |

OTHER PUBLICATIONS

International Search Report Dec. 14, 2006.

* cited by examiner

*Primary Examiner*—Anita M King
*Assistant Examiner*—Erin Smith
(74) *Attorney, Agent, or Firm*—Foley & Lardner LLP

(57) ABSTRACT

A mounting apparatus for attaching a flat panel display for a similar device to a vertical surface. The mounting apparatus includes a pair of mounting brackets each having first and second support flanges extending outwardly therefrom. First and second transverse arms are mounted upon the first and second support flanges respectively. The second transverse arm is configured to rotate between an unlocked and locked position to secure a support arm which is affixed to a display bracket which in turn is adapted to be affixed to the flat panel display. The support arm is pivotally attached at one end thereof to the display bracket an defines a curved slot at the opposite end thereof. A link arm is pivotally secured at one end thereof to the display bracket with the other end thereof slidably connected to the curved slot to enable tilting of the flat panel display.

30 Claims, 6 Drawing Sheets

DISPLAY MOUNTING APPARATUS

FIELD OF THE INVENTION

The field of the present invention is devices for mounting flat panel displays to vertical surfaces such as walls.

BACKGROUND

Devices for mounting flat panel displays to vertical surfaces, such as walls, frequently have one or more shortcomings. Some are overly difficult to affix to the vertical surface and position the flat panel display thereon as desired. Others have too high of a profile and position the flat panel display too far away from the wall. Still others offer the user no choice in the viewing angle at which the flat panel display is mounted.

SUMMARY OF THE INVENTION

The present invention is directed toward a display mounting apparatus which is particularly well suited for mounting a flat panel display to a wall or other appropriate vertical surface. The display mounting apparatus includes a mounting bracket having first and second support flanges. A first transverse arm or support is secured to the first support flange, and a second transverse arm or support is secured to the second support flange. The second transverse support is rotatable, relative to the second support flange, about a transverse axis of the second transverse support. The display mounting apparatus further includes a display bracket. This display bracket has a first support seat and a second support seat. The first support seat is adapted to bear the display bracket on the first transverse support, and the second support seat is adapted to bear the display bracket on the second transverse support. Rotation of the second transverse support places the second transverse support in locking engagement with the second support seat.

Optionally, the display bracket may include a support arm pivotally affixed to a display bracket arm. The first and second support seats may also be integral to the support arm. The display bracket may further include a link arm affixed between an end of the support arm and the display bracket arm. This link arm may be slidably affixed to a slot in the end of the support arm.

Accordingly, the present invention provides an improved display mounting apparatus. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
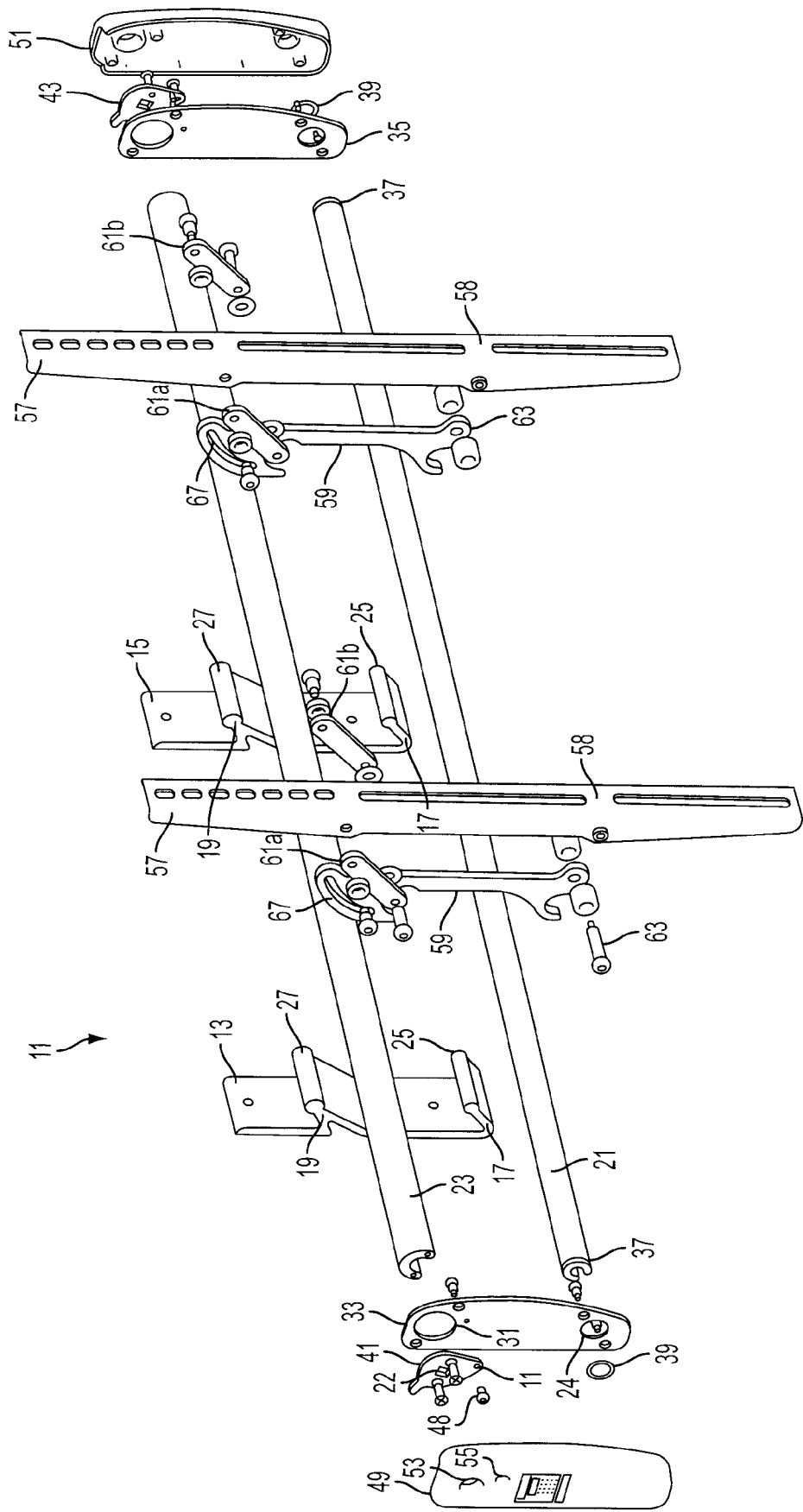
FIG. 1 illustrates an exploded perspective view of a display mounting apparatus.

Turning in detail to the drawings, FIG. 1 illustrates a display mounting apparatus 11 which includes two mounting brackets 13, 15 for affixing the display mounting apparatus 11 to a vertical surface, such as a wall (not shown). Each mounting bracket has a lower flange 17 and an upper flange 19, to which are secured the lower and upper transverse supports 21, 23. The lower flange 17 of each mounting bracket includes a radially defined terminus or end 25 having a diameter which is greater than the thickness of the lower flange 17 leading into the radially defined end 25. Similarly, the upper flange 19 of each mounting bracket includes a radially defined terminus or end 27 having a diameter which is greater than the thickness of the upper flange 19 leading into the radially defined end 27. Thus, the terminus of each flanges defines a cross-sectional area larger than the cross-sectional area of the flange proper.

The lower transverse support 21 has a cross-section which is hollow and preferably is partially annular. The inner radius of the lower transverse support 21 is sized appropriately to allow insertion of the radially defined end 25 of the lower flange 17 into the center of the lower transverse support 21. Further, the cross-sectional arc length of the lower transverse support 21 is configured so that the radially defined end 25 can only be inserted into, or removed from, the center of the lower transverse support 21 by sliding the lower transverse support 21 in a transverse direction. Preferably, the cross-sectional arc length of the lower transverse support 21 is configured such that the lower transverse support 21 cannot rotate about its transverse axis. The upper transverse support 23 is similarly configured with a partially hollow or annular cross-section, with the exception being that the cross-sectional arc length of the upper transverse support 23 permits the upper transverse support 23 to rotate through about a 40°-45° angle around its transverse axis. In a first rotational orientation, the transverse support 23 is placed in the "unlocked" position, while in a second rotational orientation, the transverse support 23 is placed in the "locked" position. Depending upon the configuration of the upper flange 19 and the upper transverse support 23, the amount of angular travel available to the upper transverse support 23 may be as much or as little as desired or needed to enable the locking engagement functionality described below.

Figure 3:
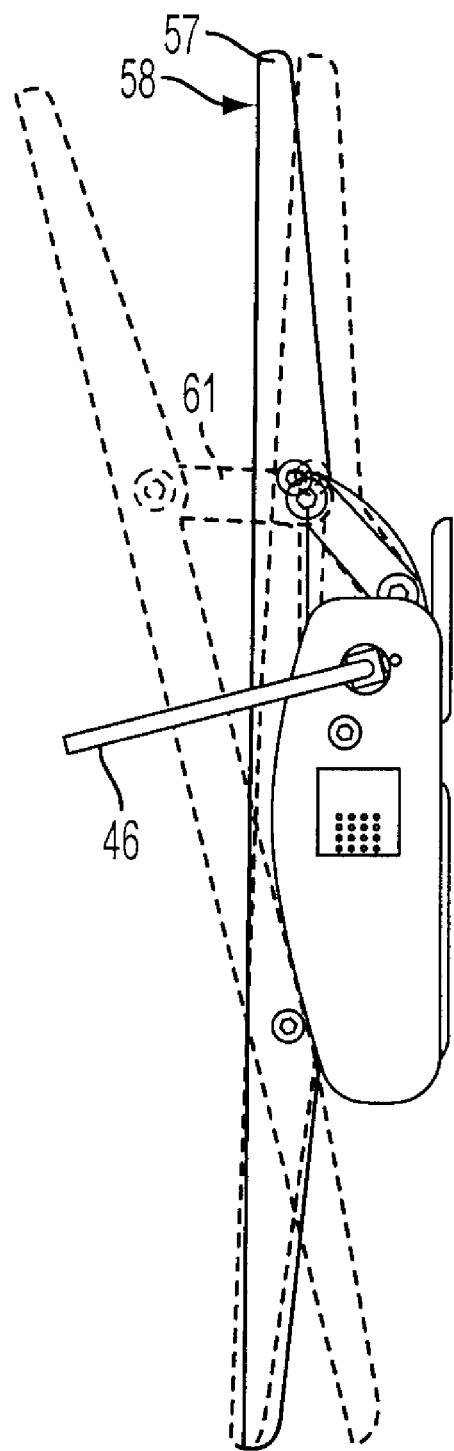
FIG. 3 illustrates the range of angles at which a display attached to the display mounting apparatus of FIG. 1 may be positioned.

Once the lower and upper transverse arms or supports 21, 23 are in position over the respective support flanges 25, 27, the ends of the transverse supports 21, 23 are inserted through holes 29, 31 in the end plates 33, 35. The lower transverse support 21 includes a circumferential notch 37 in either end. A retaining ring 39 is placed over the end of the lower transverse support 21 and into the notch 37 to retain the end plates 33, 35 on the ends of the lower transverse support 21. End caps 41, 43 are affixed to either end of the upper transverse support 23. The end caps 41, 43 include a central hole or orifice 45 which may be used to rotate the upper transverse support 23 using an appropriate tool 46 (FIG. 3). Each end cap 41, 43 also includes an additional hole or orifice 47 which may be used to secure the end caps 41, 43 to the end plates 33, 35, respectively to prevent tampering with or accidentally rotating the upper transverse support from its locked position. A screw 48 would be inserted through the hole or into the plate 33, 35 to secure the end cap in position. Cover plates 49, 51 are secured to either end plate 33, 35 to hold the end plates 33, 35 in place and unitize the upper and lower transverse supports 21, 23. Each cover plate includes one access hole 53 for inserting a tool and rotating the upper transverse support 23, and a second access hole 55 for securing the end caps 41, 43 to the end plates 33, 35.

The display bracket portion of the mounting apparatus 11 is formed primarily by the display bracket arm 57, the support arm 59, and the two link arms 61a, 61b. The face 58 of each display bracket arm 57 includes holes which are adapted to secure the display bracket arm 57 to a flat panel display (not shown) or other appropriate consumer product. The lower end of the support arm 59 is pivotally connected to the display bracket arm 57 using a pivot pin 63. The upper end of the support arm 59 is connected to the display bracket arm 57 through the link arms 61a, 61b. One end of each link arm 61a, 61b is pivotally connected to the display bracket arm 57, while the other ends of the link arms 61a, 61b are connected together through the slot 67 in the upper end of the support arm 59.

Figure 2A:
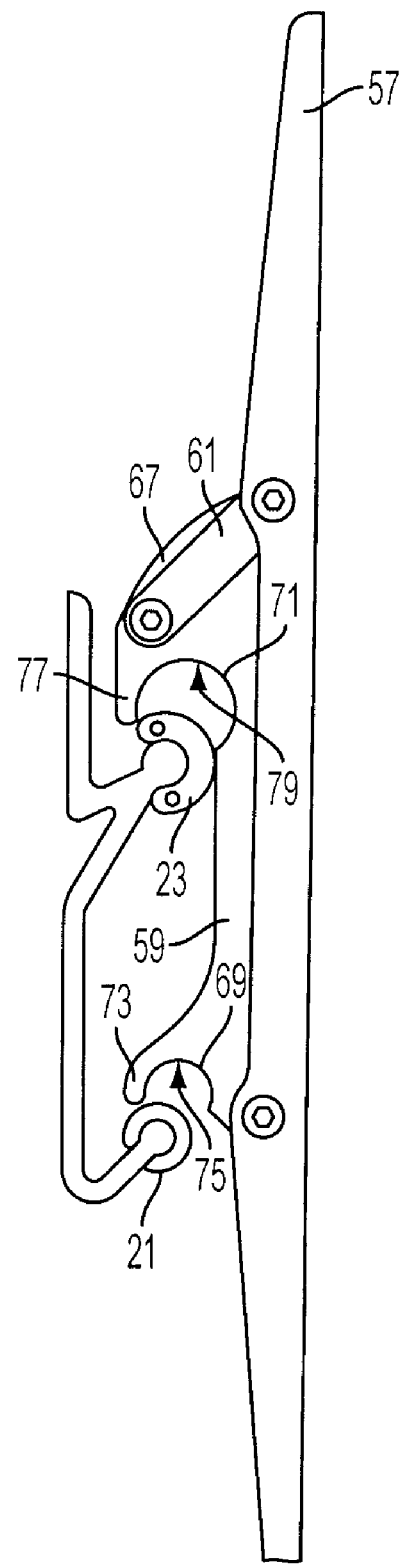
FIGS. 2A-D illustrate the process of securing the display bracket to the transverse supports in the display mounting apparatus of FIG. 1.
Figure 2B:
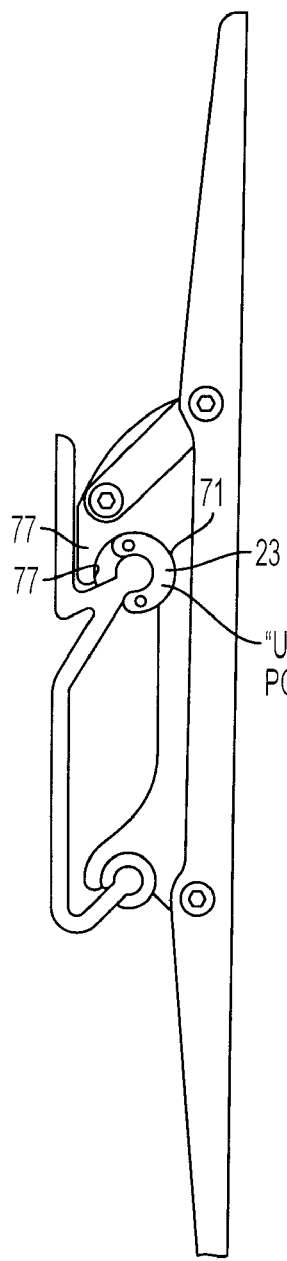
Figure 2C:
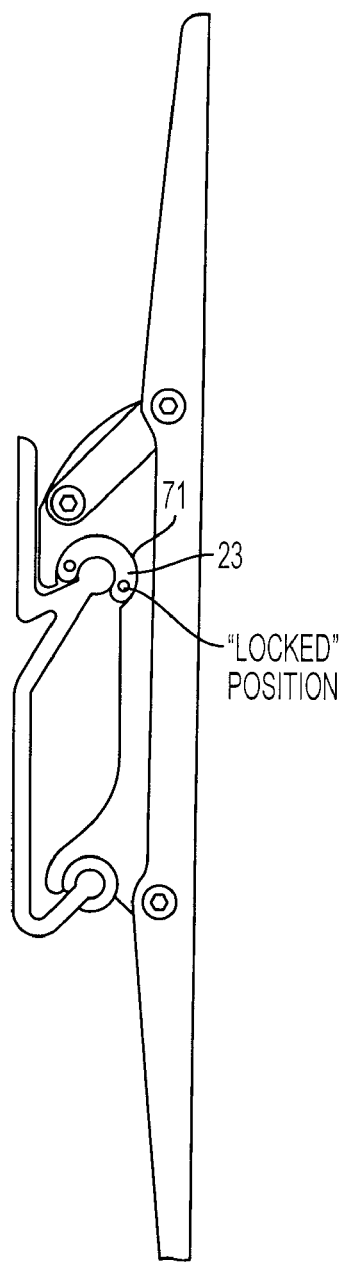

The process of securing the display bracket to the transverse supports is shown in FIGS. 2A-C. As shown in FIG. 32A, the support arm 59, along with the attached display bracket arm 57 and link arms 61 (only one is shown), includes a lower seating portion 69 and an upper seating portion 71. The lower and upper seating portions 69, 71 are positioned such that the support arm 59 may be placed on both the lower and upper transverse supports 21, 23. The lower seating portion 69 includes a curved finger 73 which extends arcuately outward from the support arm 59 such that the lower seating portion 69 forms an arcuate seating surface 75 of approximately 180°. The arc of the lower seating surface 75 may be less than 180° or have a different shape so long as the lower seating portion 69 maintains engagement with the lower transverse support 21.

The upper seating potion includes a finger 77 which extends downwardly from the support arm 69 such that the upper seating portion 71 forms an arcuate seating surface 79 of greater than 180°. The arc length of the upper seating surface 79 is formed to (A) permit the upper transverse support 23, when in the unlocked position as shown in FIGS. 2A and 2B, to be inserted into the upper seating portion 71, and (B) enable the upper transverse support 23 to be secured in locking engagement with the upper seating portion 71 when the upper transverse support 23 is rotated into the locked position, as shown in FIG. 2C.

Figure 2D:
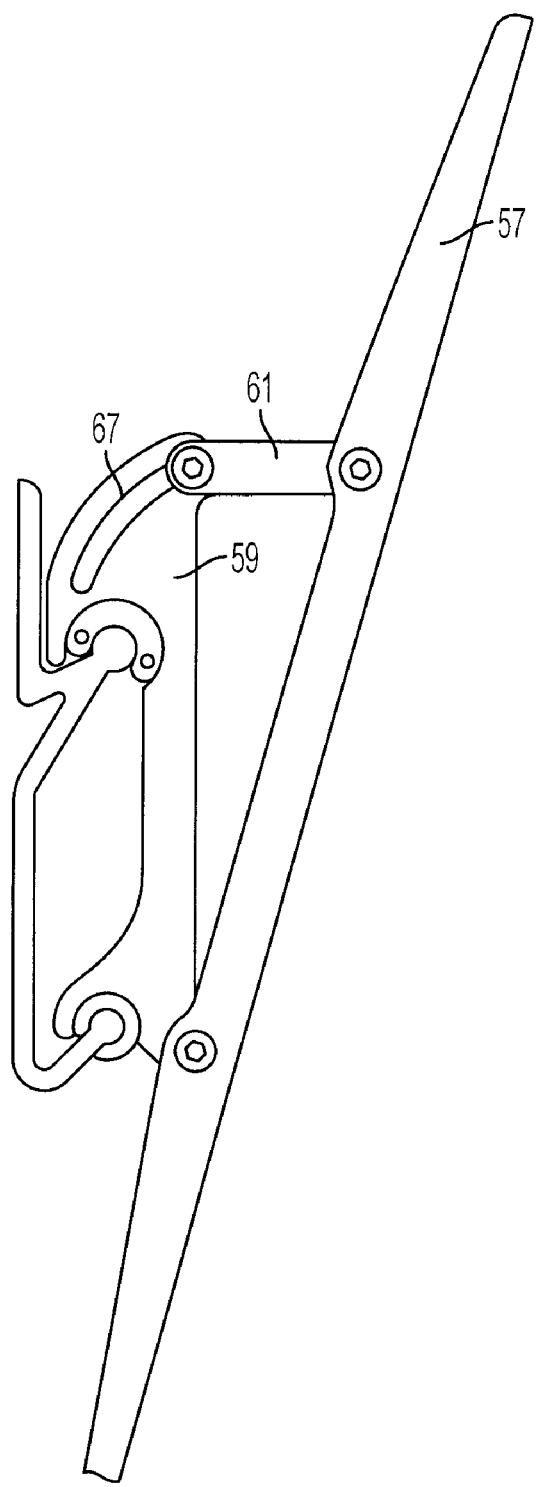

In FIG. 2D the upper portion of the display bracket 57 is shown extended forward by the length of the link arm 61. The combination of the pivot connection between the link arm 61 and the display bracket arm 57 and the slotted connection between the link arm 61 and the slot 67 in the support arm 59 allow the upper portion of the display bracket arm 57 to be tilted forward. Further, the upward and forward direction of the slot 67 in the support arm 59 provides the apparatus with a mechanical advantage that advantageously allows the display bracket arm 57 to remain in a tilted position when set, even when supporting an attached display (not shown).

FIG. 3 shows the relative angles of tilt available to the display bracket arm 57 using the configuration of the display apparatus 11 shown in FIG. 1. When the upper transverse support 23 is in the locked position and the mounting apparatus 11 is affixed to a vertical surface, the face 58 of the display bracket 57 is pivotable relative to the vertical surface. The face 58 of the display bracket 57 may be positioned such that it is parallel to the vertical surface, or it may be positioned at any point within a range of −2° up to +15° relative to the vertical surface. The length of the link arms 61 will generally determine the extent of the positioning range that is available.

Figure 4:
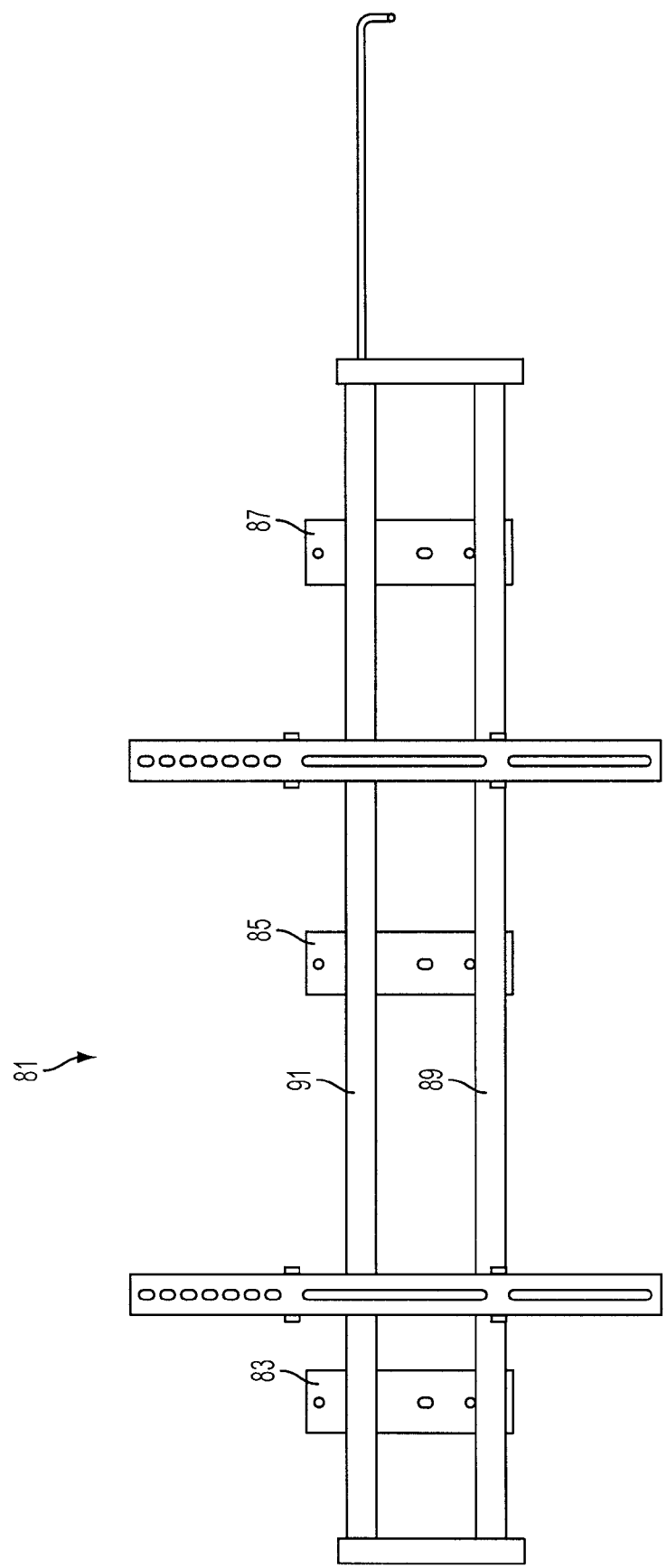
FIG. 4 illustrates a front elevation view of the display mounting apparatus having three mounting brackets.

A mounting apparatus 81 is shown in FIG. 4 having three mounting brackets 83, 85, 87 supporting the lower and upper transverse supports 89, 91. Such an alternative configuration may be used to more securely attach the mounting apparatus 81 to a vertical surface. Additional mounting brackets or display brackets may be added as needed or desired.

Thus, a display mounting apparatus is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A mounting apparatus for attaching a flat panel display to a surface comprising:
    (1) first and second mounting brackets adapted to be affixed to said surface, each having first and second outwardly extending support flanges;
    (2) first and second transverse arms, disposed on said first and second support flanges, respectively, the first and second transverse arms being adapted to move slidably on said first and second support flanges;
    (3) a display bracket for receiving said flat panel display;
    (4) a support arm having first and second seating portions connected to the first and second transverse arms; and,
    (5) links adapted to be connected to said first and second transverse arms and the support arm being adapted to be attached to said display bracket through the links.

2. A mounting apparatus as defined in claim 1, wherein at least one of said first and second transverse arms is rotatable on its respective support flange to lock said display bracket to said at least one of said first and second transverse arms.

3. A mounting apparatus as defined in claim 2 wherein said means for attaching includes a support arm having first and second seating portions engaging said first and second transverse arms, respectively.

4. A mounting apparatus as defined in claim 3 wherein said second transverse arm is rotatably between unlocked and locked positions and said second seating portion includes a seating surface having an arcuate length greater than 180° so that said second transverse arm may be inserted into said second seating portion when said second transverse arm is in its unlocked position and may be secured to said second seating portion when in its locked position.

5. A mounting apparatus as defined in claim 4 which further includes means for causing said display bracket to tilt away from said surface.

6. A mounting apparatus as defined in claim 5 wherein said support arm includes a curved slot and said means for attaching further includes a link arm pivotally connected at one end to said display bracket and slidably connected at the other end to said curved slot.

7. A mounting apparatus as defined in claim 2 which further includes an end cap secured to at least one end of said first and second transverse arms, said end cap being adapted to receive a tool for rotating at least one of said first and second transverse arms.

8. A mounting apparatus as defined in claim 7 which further defines means for preventing rotation of at least one of said first and second transverse arms from its locked to its unlocked position.

9. A mounting apparatus as defined in claim 8 wherein said means for preventing rotation includes an opening defined by said end cap adapted to receive a screw for securing said end cap in position.

10. A mounting apparatus for attaching a flat panel display to a surface comprising:
    (1) first and second mounting brackets adapted to be affixed to said surface;
    (2) each of said mounting brackets having first and second outwardly extending support flanges;
    (3) the terminus of each support flange defining an external surface and having a cross-sectional area larger than the area of the flange leading into the terminus;

(4) first and second transverse arms;

(5) said first transverse arm being adapted to receive the terminus of said first support flanges in a non-rotational configuration;

(6) said second transverse arm being adapted to receive said terminus of said second support flanges so as to permit said second transverse arm to rotate;

(7) a display bracket for receiving said flat panel display; and (8) means for attaching said display bracket to said first and second transverse arms;

wherein said first transverse arm is adapted to be inserted into or removed from said first support flanges by sliding said first transverse arm in a transverse direction.

11. A mounting apparatus as defined in claim 10 wherein the terminus of said first support flange is radially defined and the hollow cross-section of said first transverse arm is radially defined and has an arc length such that first transverse arm cannot rotate about its transverse axis.

12. A mounting apparatus as defined in claim 10 wherein the terminus of each said second support flanges is radially defined and the hollow cross-section of said second transverse arms are radially defined and adapted to receive the terminus of said second support flanges and wherein the arc length of said second transverse arm cross-section allows rotational movement of said second transverse arm about its transverse axis.

13. A mounting apparatus as defined in claim 12 wherein said means for attaching includes a support arm having first and second seating portions engaging said first and second transverse arms, respectively.

14. A mounting apparatus as defined in claim 13 wherein said second seating portion includes a seating surface having an arcuate length greater than 180° so that said second transverse arm may be inserted into said second seating portion when said second transverse arm is in its unlocked position and may be secured to said second seating portion when in its locked position.

15. A mounting apparatus as defined in claim 14 which further includes an end cap secured to an end of said second transverse arm, said end cap defining a first orifice for receiving a tool for rotating said second transverse arm about its transverse axis.

16. A mounting apparatus as defined in claim 15 wherein said end top defines a second orifice adopted to receive a screw for securing said end cap in position to prevent said second transverse arm from being rotated.

17. A mounting apparatus as defined in claim 10 wherein said means for attaching comprises a support arm pivotally secured one end thereof to said display bracket and defining a curved slot at the other end thereof, a link arm pivotally connected at one end thereof to said display bracket and slidably connected at the other end thereof to said worked slot whereby said flat panel display may be titled away from said surface.

18. A mounting apparatus as defined in 16 which further includes end plates, said end plates defining openings adopted to receive opposite ends of said first and second transverse arms respectively.

19. A mounting apparatus as defined in claim 18 which further includes corner plates secured to said end plates respectively.

20. A mounting apparatus as defined in claim 10, wherein the first and second transverse arms are adapted to move slidably on said first and second support flanges.

21. A mounting apparatus as defined in claim 10, wherein at least one of said first and second transverse arms is rotatable on its respective support flange to lock said display bracket to said at least one of said first and second transverse arms.

22. A mounting apparatus for attaching a flat panel display to a surface comprising:

(1) first and second mounting brackets adapted to be affixed to said surface, each having first and second support flanges;

(2) first and second transverse arms disposed on said first and second support flanges;

(3) A display bracket for receiving said flat panel display; and, (4) means for attaching said display bracket to said first and second transverse arms;

wherein at least one of said first and second transverse arms is rotatable on its respective support flange to lock said display bracket to said at least one of said first and second transverse arms.

23. A mounting apparatus as defined in claim 22, wherein said means for attaching includes a support arm having first and second seating portions engaging said first and second transverse arms, respectively.

24. A mounting apparatus as defined in claim 23, wherein said second transverse arm is rotatably between unlocked and locked positions and said second seating portion includes a seating surface having an arcuate length greater than 180° so that said second transverse arm may be inserted into said second seating portion when said second transverse arm is in its unlocked position and may be secured to said second seating portion when in its locked position.

25. A mounting apparatus as defined in claim 24, further comprising means for causing said display bracket to tilt away from said surface.

26. A mounting apparatus as defined in claim 25, wherein said support arm includes a curved slot and said means for attaching further includes a link arm pivotally connected at one end to said display bracket and slidably connected at the other end to said curved slot.

27. A mounting apparatus as defined in claim 22, further comprising an end cap secured to at least one end of said first and second transverse arms, said end cap being adapted to receive a tool for rotating at least one of said first and second transverse arms.

28. A mounting apparatus as defined in claim 27, further comprising means for preventing rotation of at least one of said first and second transverse arms from its locked to its unlocked position.

29. A mounting apparatus as defined in claim 28, further comprising said means for preventing rotation includes an opening defined by said end cap adapted to receive a screw for securing said end cap in position.

30. A mounting apparatus as defined in claim 22, wherein the first and second transverse arms are adapted to move slidably on said first and second support flanges.

* * * * *